Dec. 15, 1970 G. ROSEN 3,548,218
ULTRA-SHORT-DURATION HIGH-CURRENT-BURST GENERATOR
Filed Aug. 30, 1967
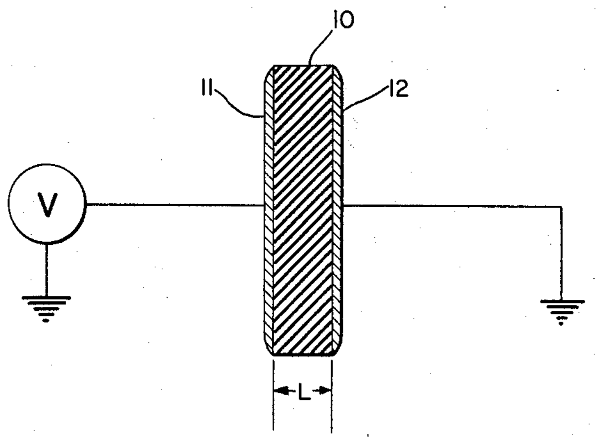
INVENTOR.
Gerald Rosen
BY
Paul + Paul
ATTORNEYS.

United States Patent Office 3,548,218
Patented Dec. 15, 1970

3,548,218
ULTRA-SHORT-DURATION HIGH-CURRENT-BURST GENERATOR

Gerald Rosen, Philadelphia, Pa., assignor to Drexel University, Philadelphia, Pa., a corporation of Pennsylvania Filed Aug. 30, 1967, Ser. No. 664,509
Int. Cl. H01l 3/00
U.S. Cl. 307—260 15 Claims

ABSTRACT OF THE DISCLOSURE

A device is disclosed for producing ultra-short-duration high-current bursts. The device comprises a chemically-pure thin insulating element, which may be either a solid or a liquid, having current-conducting electrodes on opposed surfaces thereof functioning as ohmic injecting contacts. The insulating element may, for example, be a pure cadmium sulfide wafer, having a thickness of the order of one tenth of a centimeter to one ten-thousandths of a centimeter. The current-conducting electrodes may, for example, be indium. A short-duration voltage is applied across the device to inject charge-carriers thereinto. The voltage may, for example, be of the order of from 10 to 100 volts established in a time period of the order of one-millionth of a second or less. Ultra-short-duration high-current bursts are produced having a maximum current density two or three orders of magnitude higher than would be produced by a geometrically similar condenser and the same applied voltage. The time duration of the high-current bursts is of the order of one-millionth of a second or less.

BACKGROUND OF THE INVENTION

Field of the invention

This invention relates to devices for producing high-current bursts for ultra-short durations.

Description of the prior art

The device disclosed in the present application behaves in a manner somewhat similar to a condenser, but is able to transcend the behavior of the condenser and thus to admit of many new practical applications. The new device delivers ultra-short-duration current bursts which are two or three orders of magnitude greater in maximum current density than obtained with a geometrically similar condenser and the same applied voltage.

SUMMARY OF THE INVENTION

A thin wafer of chemically pure insulating material is provided to which current conducting electrodes (ohmic injecting contacts) are cleanly attached. In response to a steep-front pulse voltage applied across the two electrodes, a pulse current with very large maximum magnitude flows for an ultra-short duration.

BRIEF DESCRIPTION OF THE DRAWING

In the single figure of drawing is shown a schematic representation of apparatus according to the present invention.

DESCRIPTION OF THE PREFERRED EMBODIMENTS

In the drawing, a wafer 10 of chemically pure insulating material having a thickness L is cleanly attached to current-conducting electrodes 11 and 12. The wafer 10 may be a thin-cut slice of a grown pure crystalline solid, such as cadmium sulfide, or iodine, or anthracene. Or, the insulating material 10 could be a non-conductive liquid, such as glycerine, or ethyl glycol. The thin in sulating element 10 is substantially free of large-cross-section traps i.e., free of trapping centers for free charge carriers.

The electrodes 11 and 12, preferably indium, function as ohmic injecting contacts, allowing a free flow of electrons (or holes) with no potential barrier. The insulation wafer 10, and the electrodes 11 and 12, may be round, square, rectangular, or may have any other geometrical cross-sectional shape or configuration. However, the wafer 10 and the electrodes 11 and 12 should have the same cross-sectional shape.

Voltage source V is connected across the electrodes 11 and 12. In the drawing, one side of the voltage source V is connected to electrode 11 and the other side is connected to electrode 12 by way of ground. The voltage source V is capable of delivering a voltage pulse which rises to the desired magnitude in a time period $\Delta t$.

In response to the applied pulse voltage from the source V across the electrodes 11 and 12, a space-charge-limited diffusion-dominated current J (times the cross-sectional area of the wafer 10) flows through the device. A theoretical analysis pertaining to this effect is given later on in this patent specification. This space-charge-limited diffusion-dominated current-burst has an ultra-short duration which lasts for a time approximately equal to $L^2/\mu V$, where L is the thickness of the thin insulating element 10, $\mu$ is the drift mobility of the charge-carrier (either electrons or holes), and V is the applied voltage established in time of the order $\Delta t$. As an example of the magnitudes of these parameters, L may be between one tenth of a centimeter and one ten-thousandth of a centimeter, $\mu$ may be between 100 and 1000 square centermeters per volt-second, and V may be of the order of 10 to 100 volts established in an appropriate time period of the order $\Delta t$, generally about or less than one millionth of a second.

The ultra-short-duration current burst has a maximum current density approximately equal to $9E\mu^2V^3/32DL^3$, where E is the permittivity of the insulating element, $\mu$ is the drift mobility of the charge-carrier, V is the applied voltage, D is the diffusivity of the charge-carrier, and L is the thickness of the thin wafer element 10. For example, E may be of the order of one-trillionth of an ampere-second per volt-centimeter, $\mu$ may be of the order of 100 to 1000 square centimeters per volt-second, V may be of the order of 10 to 100 volts established in a time of the order of one-billionth of a second, D is generally proportional to $\mu$ and may be of the order of 2.5 to 25 square centimeters per second, and L may be between one tenth of a centimeter and one ten-thousandth of a centimeter.

A current burst having a density as large as about one million amperes per square centimeter can be made to appear for a time duration $\Delta t$, where, as previously indicated, $\Delta t$ is, for example of the order of one-millionth of a second.

In brief, the device illustrated and described herein will yield a high-current burst for an ultra-short interval of time. Both the density of the current and the burst duration are determined by the geometry of the device and its intrinsic characteristics. After the interval $\Delta t$, a steady space-charge-limited current, about two orders of magnitude less than the maximum density current, will exist. In practice, the wafer 10 may contain some traps, in which case the magnitude of the steady space-charge limited current will be further reduced.

The device illustrated and described herein can provide ultra-short-duration high-current pulses or bursts of controllable shape which can be used to trigger other devices. Or, the device can be incorporated as a series element in an electric circuit to act as a fast-action current switch. As stated previously hereinabove, the device behaves in a manner generally similar to that of condenser but is able to transcend the behavior of the condenser.

As a comparison of the device disclosed herein with that of condenser, consider that for a condenser with a voltage rise time $\Delta t$ the maximum density current in the time $\Delta t$ is approximately equal to $EV/L$ whereas in the case of the new device for a voltage rise time $\Delta t$ the maximum density current is approximately equal to $9E\mu V^2/32DL$. The latter quantity is about two or three orders of magnitude greater than the current density developed by a geometrically similar condenser, because the ratio of the latter quantity to the former quantity is generally of the order of 100 to 1000. (See the theoretical analysis presented later herein.)

Thus, it will be seen that the new device emits ultra-short-duration current bursts which are two or three orders of magnitude more intense than that obtained with the geometrically similar condenser. Such extremely high current bursts may be used for many practical purposes. One example of use would be that of soldering very small circuit elements. Or, since the thin insulating device of the present disclosure features negligible internal joule heating, it can, like a condenser, remain as a fixed element in an integrated circuit to supply a high current burst whenever needed. Moreover, it would appear that such use, and the supply of such high current burst, can be used over a wide range of voltages, as for example, from about 10 volts up to the breakdown voltage of the insulating material. Moreover, the maximum current, the current pulse shape, and the burst duration, are all controllable by altering the wafer geometry and/or the internal characteristics. This additional controllability provides a new degree of freedom for circuit design beyond that which is possible with condensers.

The theoretical analysis of space-charge-limited currents in non-metallic solids, developed by the applicant of the present patent application, and published in the Sept. 26, 1966 issue of Physical Review Letters, volume 17, No. 13, is as follows:

The theory for space-charge-limited currents [1–5] in insulators and semiconductors can be extended rigorously to embrace the essentially time-dependent cases and to include charge-carrier diffusion.[6] Dynamical and diffusion effects are expected to be of practical importance in certain operating regimes for some thin nonmetallic crystal elements,[7] and extraordinary transient voltage-current relations are predicted for them by the theory outlined here.

With trapping negligible, the one-dimensional single-carrier current flow in an ideal nonmetallic solid is governed by the conduction-continuity and Poisson equations [1]

$$\frac{\partial n}{\partial t}=\frac{\partial}{\partial x}\left(\mu n\frac{\partial\varphi}{\partial x}+D\frac{\partial n}{\partial x}\right) \qquad (1)$$

$$\partial^2\varphi/\partial x^2=-(q/\epsilon)n \qquad (2)$$

for the potential field $\varphi=\varphi(x,t)$ and carrier concentration $n=n(x,t)$ of particles with constant drift mobility $\mu$, effective charge $q$, and diffusivity D in a medium of permittivity $\epsilon$; by definition, $\mu$ and $q$ have the same sign (minus for electrons, positive for holes) and the Einstein relation takes the form $D=\mu kT/q$. Combining Eqs. 1 and 2 and

[1] W. Shockley and R. C. Prim, Phys. Rev. 90, 753 (1953).
[2] R. W. Smith and A. Rose, Phys. Rev. 97, 1531 (1953).
[3] S. M. Skinner, J. Appl. Phys. 26, 498, 509 (1955).
[4] M. A. Lampert and A. Rose, Phys. Rev. 121, 26 (1961).
[5] A. Many and G. Rakavy, Phys. Rev. 126, 1980 (1962).
[6] Whereas charge-carrier diffusion plays a relatively passive role (subordinate to charge-carrier drift) for the steady currents,[1,4] it is necessary to include diffusion in a rigorous dynamical theory for space-charge-limited currents. The $D=0$ idealization [5] is a singular limiting case for the dynamical theory, Eq. (3) being parabolic with $t$=const characteristics for positive (physical) $D$ but hyperbolic with charge-carrier flowline characteristics for the academic $D=0$. Moreover, subject to an Ohmic injecting-contact boundary condition (7), the diffusion governs the flow of charge carriers for small $x$ with the drift current vanishing at the contact. Thus, the usefulness of a $D=0$ theory is quite limited, the actual smallness of physical $D$ notwithstanding.
[7] M. A. Lampert, private communication.

integrating twice with respect to $x$, one obtains the inhomogeneous nonlinear equation $$\frac{\partial\varphi}{\partial t}-\tfrac{1}{2}\mu\left(\frac{\partial\varphi}{\partial x}\right)^2-D\frac{\partial^2\varphi}{\partial x^2}=-\epsilon^{-1}xJ$$

$$+(\text{trivial gauge function of } t \text{ above}) \qquad (3)$$

where $J=J(t)$ is the total Maxwell current (drift plus diffusion plus displacement) per unit area. Equation 3, an inhomogeneous Burgers equation [8] for $\partial\varphi/\partial x$, can be integrated exactly; [9] it is satisfied by $$\varphi=-\epsilon^{-1}x\int_0^t J(t')dt'+\frac{2D}{\mu}\ln\psi \qquad (4)$$

if $\psi$ $(>0)$ satisfies the homogeneous linear equation $$\frac{\partial\psi}{\partial t}+\frac{\mu}{\epsilon}\int_0^t J(t')dt'\frac{\partial\psi}{\partial x}-D\frac{\partial^2\psi}{\partial x^2}=0 \qquad (5)$$

Hence, in the case of an unbounded $x$ domain, (4) satisfies Eq. 3 with $$\psi=\tfrac{1}{2}(\pi Dt)^{-1/2}\int_{-\infty}^{\infty}\exp\{-(4Dt)^{-1}[\xi-x+(\mu/\epsilon)\int_0^t(t-t')\times J(t')dt']^2+(\mu/2D)\varphi_0(\xi)\}d\xi \qquad (6)$$

in which $\varphi_0(x)\equiv(x,0)$ is the prescribed initial potential field.[10]

Of greater practical interest is a finite $x$ domain $0\leqslant x\leqslant L$, appropriate to a thin insulating crystal of length L. With an ohmic injecting contact at $x=0$, the boundary condition $$\left(\frac{\partial\varphi}{\partial x}\right)_{x=0}=0 \text{ implying}$$

$$\left(\frac{\psi^{-1}\partial\psi}{\partial x}\right)_{x=0}=\frac{\mu}{2\epsilon D}\int_0^t J(t')dt' \qquad (7)$$

is a satisfactory approximation,[11] compatible with a prescribed potential difference $$V=V(t)\equiv\varphi(L,t)-\varphi(0,t) \qquad (8)$$

with $\mu V>0$ for $t>0$ that is established as an external voltage source. Subject to a field-free initial condition $\varphi(x,0)=0$ [requiring $V(0)=0$], the space-change-limited solution [12] to Eq. 5 with (7) and (8) can be obtained by application of well-known linear methods, although the exact solution is not expressible in closed form. However, an approximate version of the solution to Eq. 5 with 7 and

[8] J. M. Burgers, Proc. Acad. Sci. Amsterdam 53, 247 (1950).
[9] J. D. Cole, Quart. Appl. Math. 9, 225 (1951).
[10] Ordinarily, the integral (6) can be evaluated with the method of steepest descents, which gives the more explicit but approximate solution $$\varphi=\varphi o(\lambda)-\tfrac{1}{2}[\varphi o'(\lambda)]^2\mu t-(D)/\mu)\ln[1-\mu t\varphi o''(\lambda)]-\epsilon^{-1}x\int_0^t J(t')dt'$$

where $\lambda=\lambda(x,t)$ is a real root of the equation $$x-\lambda+\varphi_0'(\lambda)\mu t-(\mu/\epsilon)\int_0^t(t-t')J(t')dt'=0$$

[11] M. A. Lampert and A. Rose, Phys. Rev. 113, 1236 (1959).
[12] The macroscopic theory also admits the "condenser" solution to Eq. (5) with (7) and (8), approximately of the form $$\psi=\tfrac{1}{2}[1+\exp\{(\mu/\epsilon D)x\int_0^t J(t')dt'\}]$$

with $$J=(1-e^{-\mu V/D})^{-1/2}(\epsilon/L)\dot{V}$$

for $$|\dot{V}|\ll|\mu|V^2/L^2$$

In the case of an ineffective Ohmic contact that fails to provide a free supply of charge carriers for the conduction band of the insulating crystal, the latter solution supersedes (9).

8, valid with good accuracy provided that the applied voltage (8) does not change too rapidly after an initial transient rise, i.e., $|\dot{V}| \ll |\mu| V^2/L^2$ for $t \gtrsim L^2/\mu V$, is given by $$\psi = \exp\{(\mu/2\epsilon D)x \int_0^t J(t')dt' + (2\mu J/\epsilon)^{1/2} x^{3/2}/3D\}$$

$$\text{for } 0 \leqq x \leqq \lambda$$

$$= \exp\{(\mu/2\epsilon D)x \int_0^t J(t')dt' + \mu V x/2DL\}$$

$$\text{for } \lambda \leqq x \leqq L \qquad (9)$$

with $$J = \vartheta \mu \epsilon V^2/8L^2\lambda \qquad (10)$$

and $$\lambda \equiv \min.\{(\mu/\epsilon) \int_0^t (t-t')J(t')dt' + 2(Dt)^{1/2}, L\} \qquad (11)$$

A transient voltage-current relation follows from (10) and (11), the current density determined implicitly by the applied voltage; by introducing some obvious approximations, the explicit dependence is found to take the approximate form $$J \cong \vartheta \mu \epsilon V^2/16L^2(Dt)^{1/2} \text{ for } 0 \leqq t \lesssim t_1$$

$$\cong \vartheta \epsilon V/8Lt \text{ for } t_1 \lesssim t \lesssim t_2$$

$$\cong \vartheta \mu \epsilon V^2/8L^3 \text{ for } t_2 \lesssim t \qquad (12)$$

where the characteristic times are $$t_1 \equiv 4DL^2/\mu^2V^2 \cong 4(2.5 \text{ cm.}^2/\text{sec.})(10^{-2} \text{ cm.})^2 \times (10^2 \text{ cm.}^2/\text{v. sec.})^{-2}(10V)^{-2} = 10^{-9} \text{ sec.}$$

$$t_2 \equiv L^2/\mu V \cong (10^{-2} \text{ cm.})^2/10^2 \text{ cm.}^2/\text{v. sec.})(10 \text{ v.}) = 10^{-7} \text{ sec.}$$

for typical physical magnitudes. Hence, in the case of an applied voltage that rapidly attains a finite constant value in a time of the order $t_1$, the associated current density increases in magnitude from $J(0)=0$[13] to a maximum value about equal to $J(t_1) \cong \vartheta \epsilon \mu^2 V^3/32DL^3$ ($\cong \pm 1$ A./cm.$^2$, for typical physical magnitudes) and then decreases in magnitude asymptotically to the steady or quasisteady value[1] $J(t_2) \cong \vartheta \mu \epsilon V^2/8L^3$ ($\cong \pm 10^{-2}$ A./cm.$^2$, again for typical physical magnitudes). The very large diffusion-dominated transient current density, two orders of magnitude greater than the steady space-charge-limited value for J, should be observable with fast electronic circuitry and near-perfect insulating crystals substantially free of large-cross-section traps.

---

[13] For the $D=0$ idealization, (10) and (11) produce $J(0)=3\epsilon \dot{V}(0)/2L$, a condenser-type[12] voltage-current relation. Naturally, the $D=0$ theory[5] cannot predict the large diffusion-dominated transient current density.

What is claimed is:

1. A device for producing ultra-short-duration high-density current bursts comprising:
   (a) a thin wafer of chemically pure insulating material having a thickness of the order of one-tenth to one-ten-thousandth of a centimeter and being substantially free of trapping centers for free-charge carriers,
   (b) conductive-injecting electrodes in ohmic contact with opposed surfaces of said wafer,
   (c) a voltage source connected to said electrodes for establishing potential for injection of charge-carriers into said device in time periods of the order of one-millionth of a second or less,
   (d) whereby current flows with maximum magnitude of the order of one hundred thousand amperes per square centimeter of said device for time durations of one-millionth of a second or less.

2. A device according to claim 1 characterized in that said insulation material is a pure crystalline solid.

3. A device according to claim 2 characterized in that said insulation material is cadmium sulfide.

4. A device according to claim 2 characterized in that said conductive electrodes and said thin wafer have the same cross-sectional shape.

5. A device according to claim 3 characterized in that said conductive electrodes are indium.

6. A device according to claim 1 characterized in that said conductive-injecting electrodes are indium.

7. A device according to claim 6 characterized in that said potential established by said voltage source is less than 100 volts.

8. A device for producing ultra-short-duration high-density current bursts comprising:
   (a) a thin wafer of chemically pure and trap free insulating material having a thickness of the order of one-tenth to one-ten-thousandth of a centimeter and being substantially free of trapping centers for free-charge carriers,
   (b) conductive-injection electrodes in ohmic contact with opposed surfaces of said wafer,
   (c) a voltage source connected to said electrodes for establishing potential for injection of charge-carriers into said device in a time period of the order of one-millionth of a second or less,
   (d) thereby producing a space-charge-limited diffusion-dominated transient current of the order of 100,000 amperes per square centimeter.

9. A device according to claim 8 characterized in that said two conductive electrodes and said trap-free wafer have the same cross-sectional shape.

10. A device according to claim 9 characterized in that said potential established by said voltage source is less than 100 volts.

11. A device according to claim 10 characterized in that said insulation material is a pure crystalline solid.

12. A device according to claim 11 characterized in that said insulation material is cadmium sulfide.

13. A device according to claim 12 characterized in that said conductive-injecting electrodes are indium.

14. A device for producing an ultra-short-duration high-density current burst comprising:
   (a) a thin insulating wafer having a thickness within the range of one-tenth to one-ten-thousandth centimeter, and being substantially free of trapping centers for free-charge carriers;
   (b) conductive-injecting electrodes in ohmic contact with opposed surfaces of said wafer;
   (c) said wafer and said electrodes having the same cross-sectional shape; and,
   (d) said electrodes cooperating with said wafer such that no appreciable potential barrier exists within the device, and such that a space-charge-limited diffusion-dominated current flows through said device in response to an applied voltage pulse.

15. A device according to claim 14 characterized in that said wafer may be comprised of a non-conductive liquid.

References Cited

UNITED STATES PATENTS

| | | | |
|---|---|---|---|
| 3,116,427 | 12/1963 | Giaever | 317—234 X |
| 3,121,177 | 2/1964 | Davis | 317—235 X |
| 3,150,282 | 9/1964 | Geppert | 313—346 |
| 3,321,711 | 5/1967 | Wolfe | 317—235 X |
| 3,398,021 | 8/1968 | Lehrer et al. | 317—234 X |

JAMES D. KALLAM, Primary Examiner

U.S. Cl. X.R.

317—231, 237

PO-1050
(5/69)

UNITED STATES PATENT OFFICE
CERTIFICATE OF CORRECTION

Patent No. 3,548,218 Dated December 15, 1970

Inventor(s) Gerald Rosen

It is certified that error appears in the above-identified patent and that said Letters Patent are hereby corrected as shown below:

Column 2, line 31, change "centermeters" to --centimeters--

Column 4, line 43, change "as" to --by--.

Column 4, line 45, change "change" to --charge--.

Column 4, line 56, in the equation, after "D" omit --)--.

Signed and sealed this 23rd day of March 1971.

(SEAL)
Attest:

EDWARD M.FLETCHER,JR.
Attesting Officer

WILLIAM E. SCHUYLER, JR.
Commissioner of Patents